US009397537B2

(12) United States Patent
Poulin et al.

(10) Patent No.: US 9,397,537 B2
(45) Date of Patent: Jul. 19, 2016

(54) COOLING ASSEMBLY FOR ELECTRIC MACHINES (71) Applicant: TM4 INC., Boucherville (CA)

(72) Inventors: Stéphane Poulin, Sainte-Julie (CA); Bruno Carpentier, St-Basile-le-Grand (CA); Benjamin Martineau, Boucherville (CA)

(73) Assignee: TM4 INC., Boucherville (CA)

( * ) Notice: Subject to any disclaimer, the term of this patent is extended or adjusted under 35 U.S.C. 154(b) by 0 days.

(21) Appl. No.: 14/355,769

(22) PCT Filed: Nov. 6, 2012

(86) PCT No.: PCT/CA2012/001038
§ 371 (c)(1),
(2) Date: May 1, 2014

(87) PCT Pub. No.: WO2013/067626
PCT Pub. Date: May 16, 2013

(65) Prior Publication Data
US 2014/0292116 A1    Oct. 2, 2014

Related U.S. Application Data (60) Provisional application No. 61/557,080, filed on Nov. 8, 2011.

(51) Int. Cl.
*H02K 9/00*   (2006.01)
*H02K 9/06*   (2006.01)
*H02K 5/10*   (2006.01)
(Continued)

(52) U.S. Cl.
CPC ... *H02K 9/22* (2013.01); *H02K 3/38* (2013.01)

(58) Field of Classification Search
CPC .................................. H02K 9/00; H02K 9/22
USPC .................................... 310/52, 53, 64, 88, 89
See application file for complete search history.

(56) References Cited

U.S. PATENT DOCUMENTS 3,719,436 A * 3/1973 McFarlin ................. H02K 7/14
                                                                417/356
3,995,181 A   11/1976 Suit
(Continued)

FOREIGN PATENT DOCUMENTS

CN    101490932 A    7/2009
CN    203135652 U    8/2013
(Continued)

OTHER PUBLICATIONS

PCT International Search Report for PCT International Patent Application No. PCT/CA2012/001038; date of mailing Feb. 7, 2013; 3 pages.
(Continued)

Primary Examiner — Jose Gonzalez Quinone
(74) Attorney, Agent, or Firm — K&L Gates LLP (57) ABSTRACT A cooling assembly for the stator of an electric machine provided with coils including heads is described herein. The cooling assembly includes a generally cylindrical cooling body provided with opposite longitudinal ends and at least one head-cooling element mounted to one of the longitudinal end of the body; the head-cooling element being so configured as to enclose heads of the coils and to receive heat conducting material therein.

16 Claims, 6 Drawing Sheets (51) Int. Cl.
*H02K 9/22* (2006.01)
*H02K 3/38* (2006.01)

(56) References Cited

U.S. PATENT DOCUMENTS

| | | | |
|---|---|---|---|
| 4,818,906 A | | 4/1989 | Kitamura et al. |
| 6,819,016 B2 | | 11/2004 | Houle et al. |
| 6,960,851 B2 | | 11/2005 | Poulin et al. |
| 6,992,411 B2 | | 1/2006 | Houle et al. |
| 2002/0089242 A1 | | 7/2002 | Liang et al. |
| 2010/0176669 A1* | | 7/2010 | Houle et al. .................. 310/54 |

FOREIGN PATENT DOCUMENTS

| | | | |
|---|---|---|---|
| GB | 1436298 A | * | 5/1976 |
| JP | 2007143245 | | 6/2007 |
| WO | 2008/007052 A2 | | 1/2008 |
| WO | 2010012070 | | 2/2010 |
| WO | 2010081216 | | 7/2010 |

OTHER PUBLICATIONS

PCT Written Opinion for PCT International Patent Application No. PCT/CA2012/001038; date of mailing Feb. 7, 2013; 4 pages.

* cited by examiner

COOLING ASSEMBLY FOR ELECTRIC MACHINES

This application is a national phase under 35 U.S.C. 371 of International Application No. PCT/CA2012/001038 filed on Nov. 6, 2012, which claims priority to and benefit of U.S. Ser. No. 61/557,080 filed on Nov. 8, 2011, the entirety of these applications are incorporated by reference herein.

FIELD

The present disclosure relates to electric machines. More specifically, the present disclosure is concerned with a cooling assembly configured to cool the stator of an electric machine.

BACKGROUND

Stators of electric machines are routinely made of a stack of laminations provided with coil receiving slots defined by projecting teeth therebetween. In some instances, prewound coils, for example made of rectangular wires, are to be inserted in these coil-receiving slots. These prewound coils include two generally longitudinal legs to be inserted in the slots and two generally curved heads that interconnect and are often integral with the longitudinal legs. These coil heads project from the laminations and are conventionally not in contact therewith.

When the electric machine is in operation, heat is generated in the coils. Accordingly, a cooling assembly is provided to extract heat from the laminations. However, conventional cooling assemblies are associated only with the laminations and therefore heat extraction from the coil heads is not optimal.

DETAILED DESCRIPTION

In accordance with an illustrative embodiment, there is provided a cooling assembly for the stator of an electric machine provided with coils including heads; the cooling assembly including:

a generally cylindrical cooling body provided with opposite longitudinal ends; and a head-cooling element mounted to one of the longitudinal end of the generally cylindrical cooling body; the head-cooling element being so configured as to enclose the heads of the coils and to receive heat conducting material therein.

According to another aspect, there is provided a stator for electric machine, the stator comprising:

a cooling surface;

a plurality of slots so configured as to receive coils therein, each coil being provided with heads at longitudinal ends thereof;

a generally cylindrical cooling body provided with opposite longitudinal ends and a cooling surface so configured as to contact the cooling surface of the stator; and a head-cooling element mounted to one of the longitudinal end of the generally cylindrical cooling body; the head-cooling element being so configured as to enclose the heads of the coils and to receive heat conducting material therein.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

Other objects, advantages and features of the cooling assembly for electric machines will become more apparent upon reading of the following non-restrictive description of illustrative embodiments thereof, given by way of example only with reference to the accompanying drawings.

Generally stated, illustrative embodiments described herein are concerned with cooling assemblies that cool both the straight legs and the curved heads of prewound coils. Of course, one skilled in the art will be in a position to use the cooling assemblies described herein in the design of electric machines using other types of coils.

Figure 1:
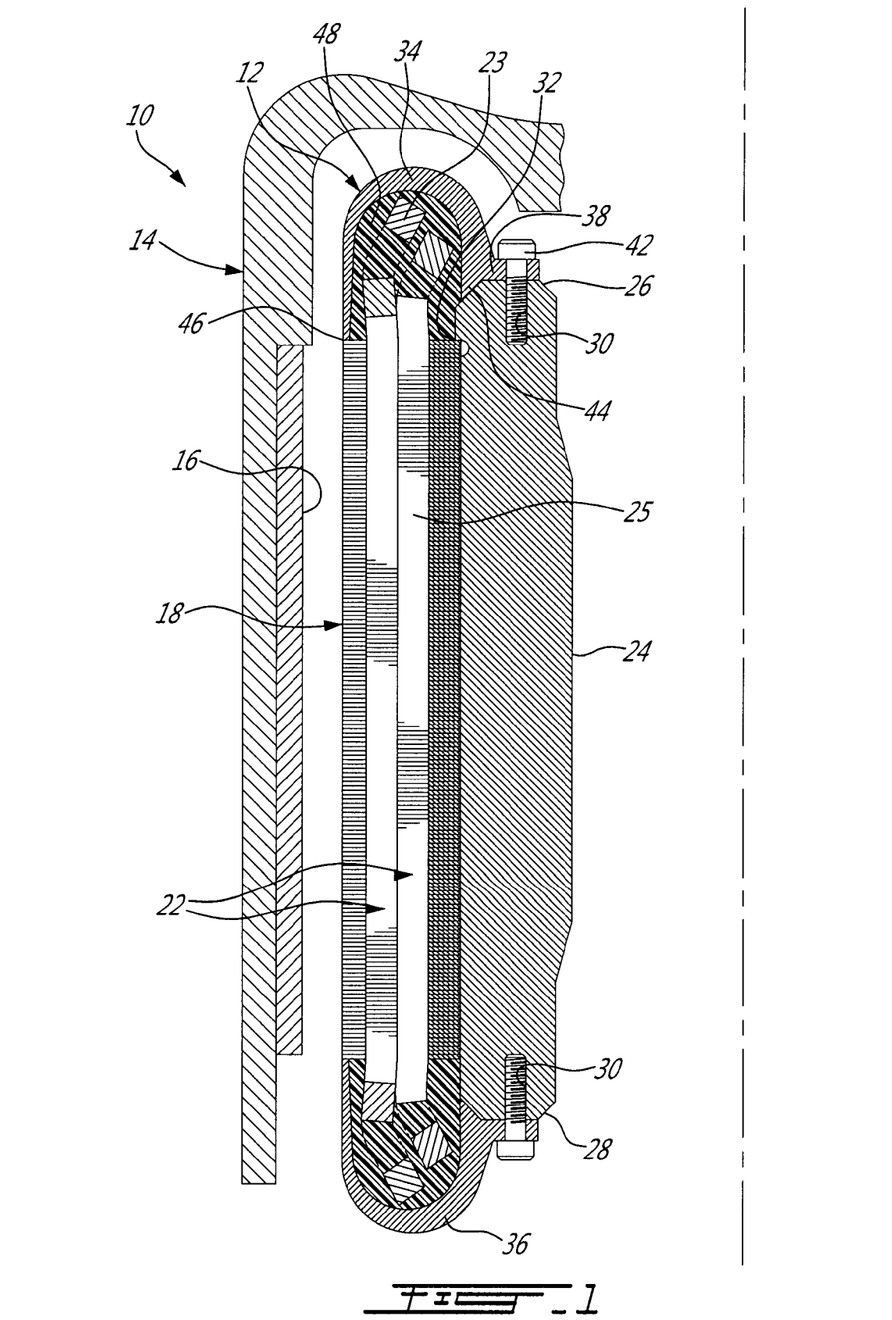
FIG. 1 is a sectional view of a portion of an electric machine incorporating a cooling assembly according to a first illustrative embodiment.

FIG. 1 of the appended drawings illustrates, in a partial sectional view, an electric machine 10 provided with a cooling assembly 12 according to a first illustrative embodiment.

The electric machine 10 includes an external rotor 14, provided with inwardly facing permanent magnets 16, and a stator 18 made of multiple stacked laminations provided with outwardly projecting teeth 20 (see FIG. 2) defining coil slots therebetween where coils 22 are inserted.

The prewound coils 22 include head portions 23 interconnecting straight legs 25 of the coils inserted in the coil slots. As can be seen from FIG. 1, the heads 23 project axially and outwardly from the stack of laminations forming the stator 18. Accordingly, the coil heads 23 are only cooled by convection and not by direct contact with the stator 18.

The cooling assembly 12 includes a generally cylindrical body 24 that is inserted in the stator 18 to contact the inner surface thereof to extract the heat generated by the coils 22. The inner surface of the stator 18 therefore being the cooling surface thereof. As a non-limiting example, a cooling fluid (not shown) could be circulated in channels (also not shown) of the body 24 of the cooling assembly 12 to extract heat therefrom via its contact with the cooling surface of the stator 18. A key and keyway arrangement 25 is provided between the cooling assembly 12 and the stator 18 to prevent relative rotation therebetween (see FIG. 2).

The cylindrical body 24 includes first and second opposite longitudinal ends 26 and 28 each provided with threaded apertures 30. The first longitudinal end 26 includes an external shoulder 32 against which the laminations 20 of the stator 18 rest.

The cooling assembly 12 is also provided with two identical head-cooling elements 34 and 36. For concision purpose, only head-cooling element 34 will be described hereinbelow.

Figure 2:
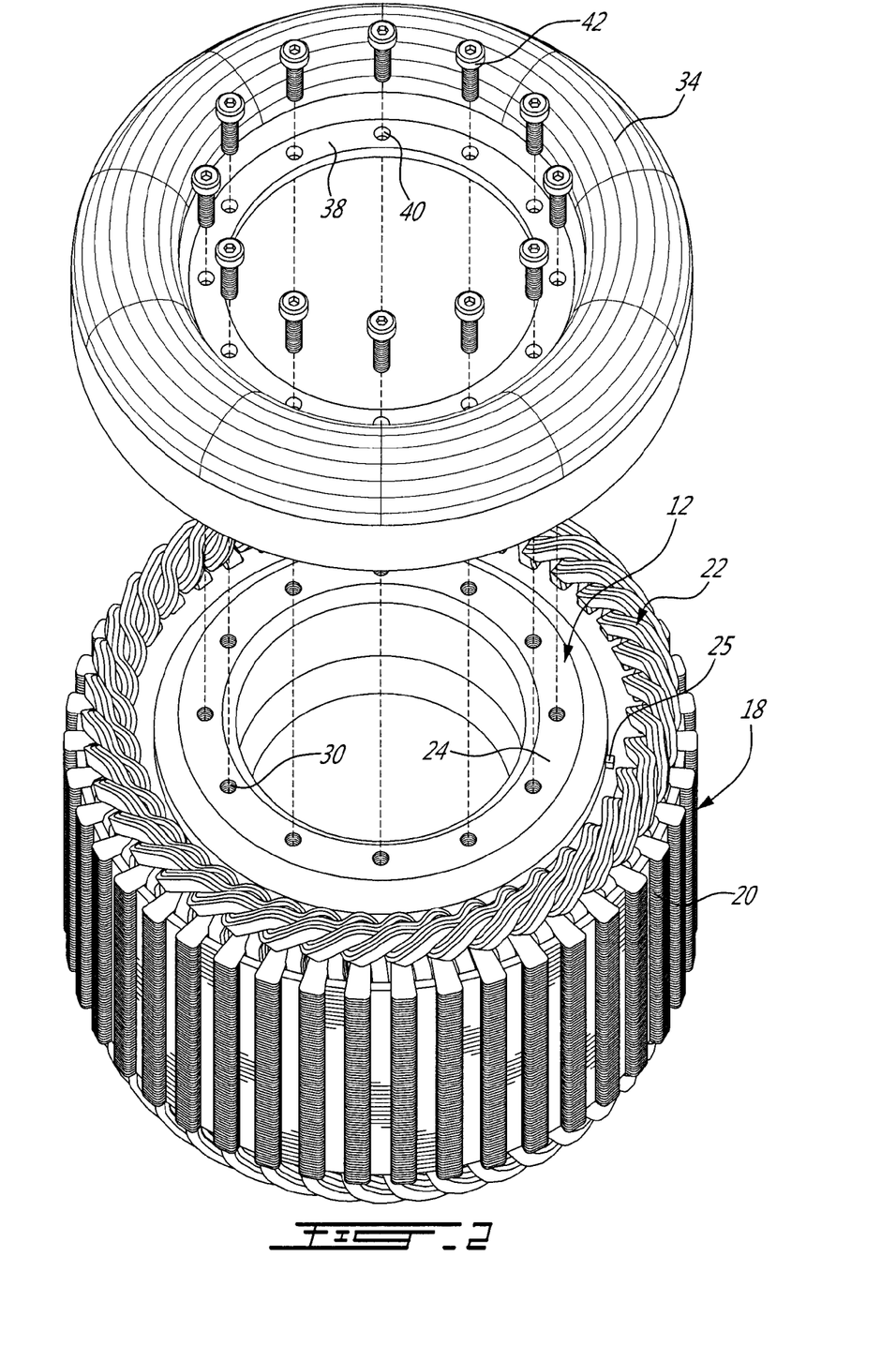
FIG. 2 is a partially exploded perspective view of the stator of the electric machine of FIG. 1, showing the cooling assembly with the head-cooling element exploded therefrom.
Figure 3:
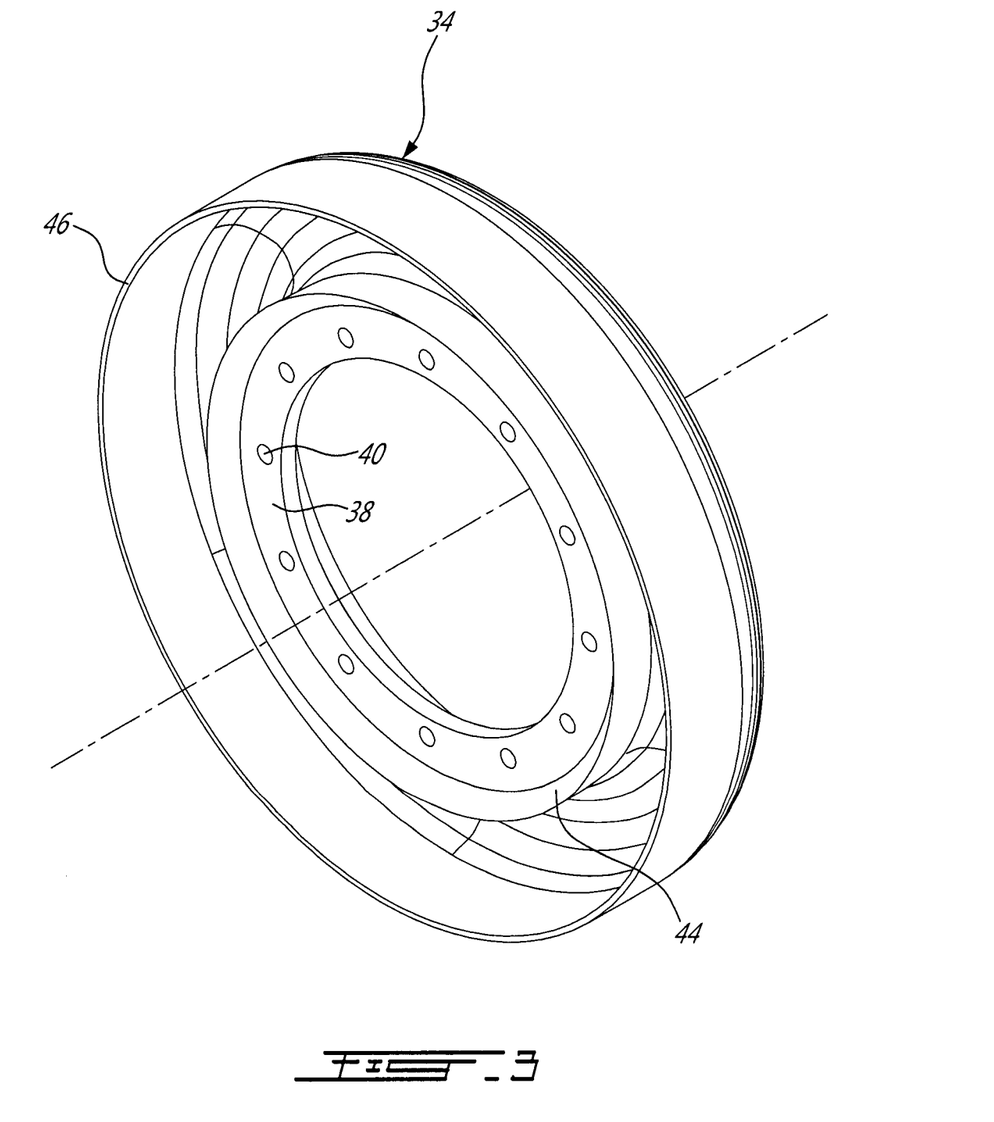
FIG. 3 is a perspective view of a coil head-cooling element.

As can be better seen from FIGS. 2 and 3 the head-cooling element 34 has a generally torus shape and includes a circular flange 38 provided with a plurality of apertures 40 so configured and sized as to allow fasteners 42 therethrough to mount the head-cooling element 34 to the free end 26 of the body 24 via the threaded apertures 30.

As can be better seen from FIG. 3, the flange 38 includes an inwardly projecting triangular shoulder 44 to conform to the shape of the free end 26 of the body 24 (see FIG. 1). The projecting triangular shoulder 44 increases the surface of contact between the head-cooling element 34 and the cooling body 24, therefore improving the cooling of the coil heads.

The head-cooling element 34 has an outer diameter comparable to the diameter of the laminations forming the stator 18. Accordingly, a free end 46 of the head-cooling element 34 abuts the laminations of the stator 18 when the head-cooling element is mounted to the body 24 as can be seen in FIG. 1.

A thermally conducting resin 48 fills the area between the heads 23 of the coils 22, the lamination stack 18, the cooling body 24 and the head-cooling element 34. For example, a thermally conducting resin made by Cool Polymer under number D5506 could be used. Of course, other materials, such as, for example, Duralco™ 4538 made by Cotronics Corporation could also be used.

To assemble the cooling assembly 12 to the stator 18, the following steps can be done. First, the laminations 20 are assembled and the coils 22 are mounted thereto. Second, the head-cooling element 34 is mounted to the cooling assembly body 24 via the fasteners 42.

The stack of laminations 20 can then be slid onto the cooling assembly body 24 until they abut the shoulder 32. The second head-cooling element 36 may then be mounted to the cooling assembly body 24 via fasteners.

Finally, heat-conducting resin may be introduced in the cavities formed by the head-cooling elements 34, 36 and the entire stator may be placed into an adequate environment to allow the curing of the resin. The resin introduction may be done via small apertures (not shown) of the head-cooling elements that are then sealed.

Of course, one skilled in the art will understand that other sequence of steps could be done to assembly the cooling assembly to the stator. Similarly, other assembly methods could be used.

It is to be noted that while the two head-cooling elements 34 and 36 of the cooling assembly 12 are shown and described as identical, it is not a requirement. For example, one of the cooling elements could include apertures (not shown) allowing cables for the electrical connections to the prewound coils to be passed therethrough.

It is to be noted that the apertures 40 of the head-cooling elements could be slightly larger than the fastener 42, to ensure an adequate fit should the generally cylindrical body 24 of the cooling assembly 12 be deformed during use so as to ensure adequate contact between the head-cooling elements and the cylindrical body 24, for example.

Figure 4:
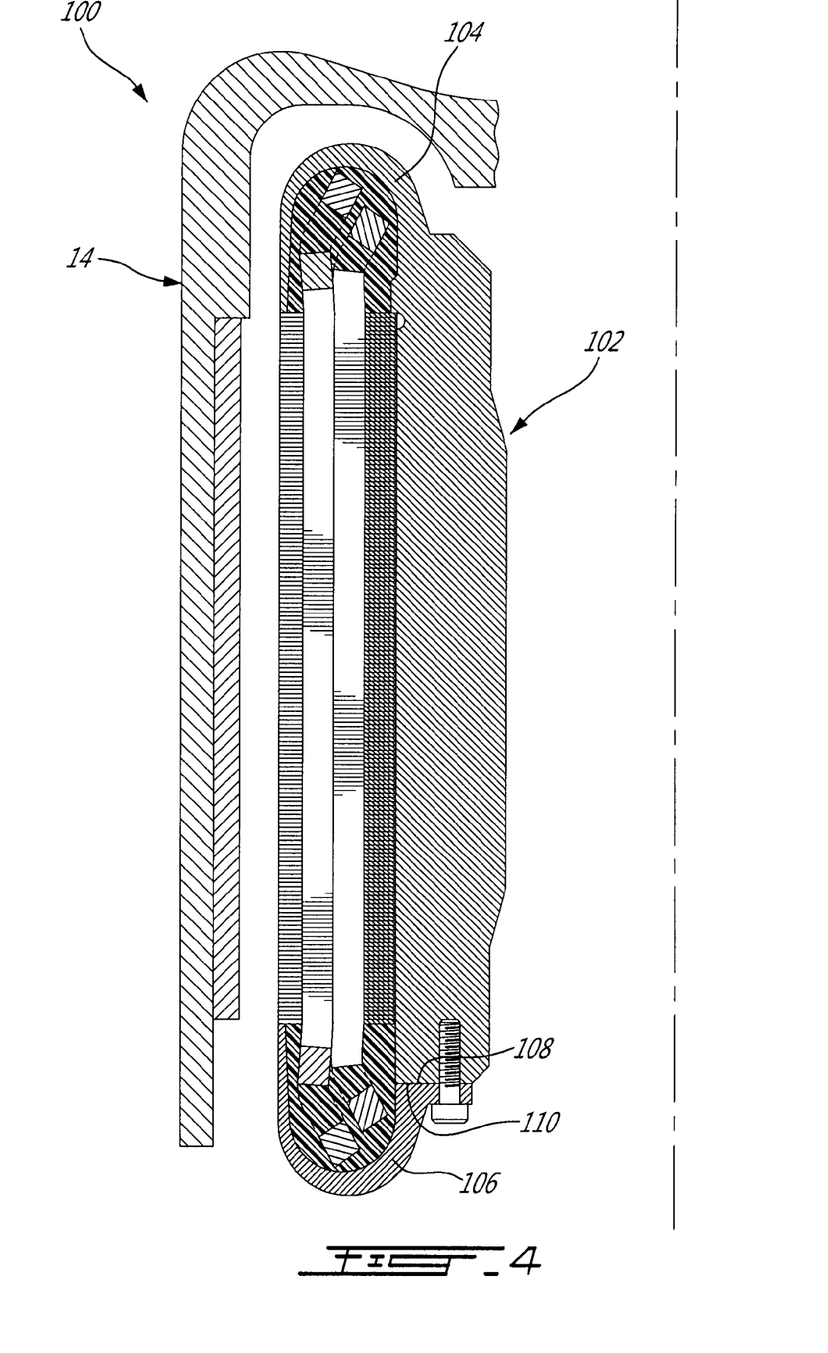
FIG. 4 is a sectional view similar to FIG. 1 but illustrating an electric machine incorporating a cooling assembly according to a second illustrative embodiment.

Turning now to FIG. 4 of the appended drawings an electric machine 100 including a cooling assembly according to a second illustrative embodiment will be briefly described. Since the electric machine 100 and the electric machine 10 are very similar, only the differences therebetween will be discussed hereinbelow, for concision purpose.

Generally stated, the cooling assembly 102 of the machine 100 has an integral head-cooling element 104 at one end thereof and a removable head-cooling element 106 at the opposite end. Accordingly, fewer fasteners are required and a better heat transfer ensues.

It is also to be noted that the head-cooling element 106 has a generally flat shoulder 108 mating with a flat portion 110 of the body 112 instead of having a triangular shoulder 44 similar to the head-cooling element 34 of FIG. 1.

Figure 5:
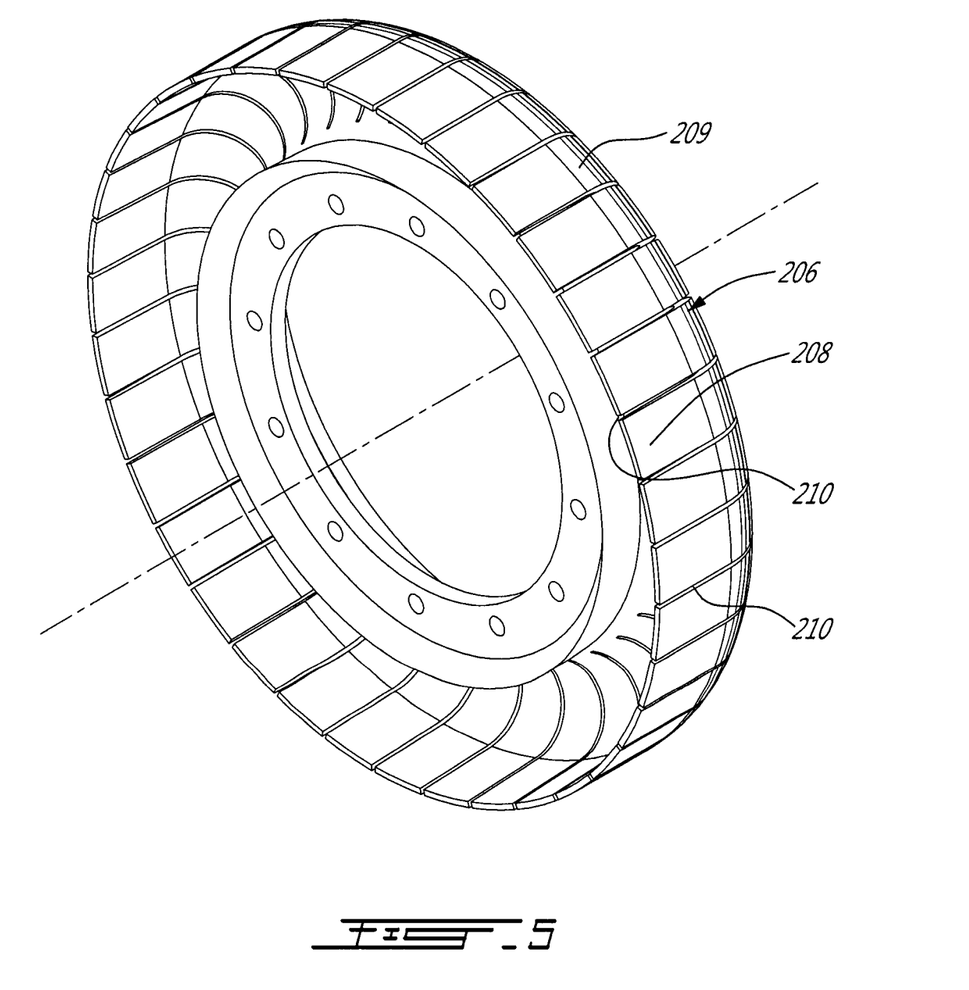
FIG. 5 is a perspective view similar to FIG. 3 showing a coil head-cooling element part of a third embodiment of a cooling assembly.
Figure 6:
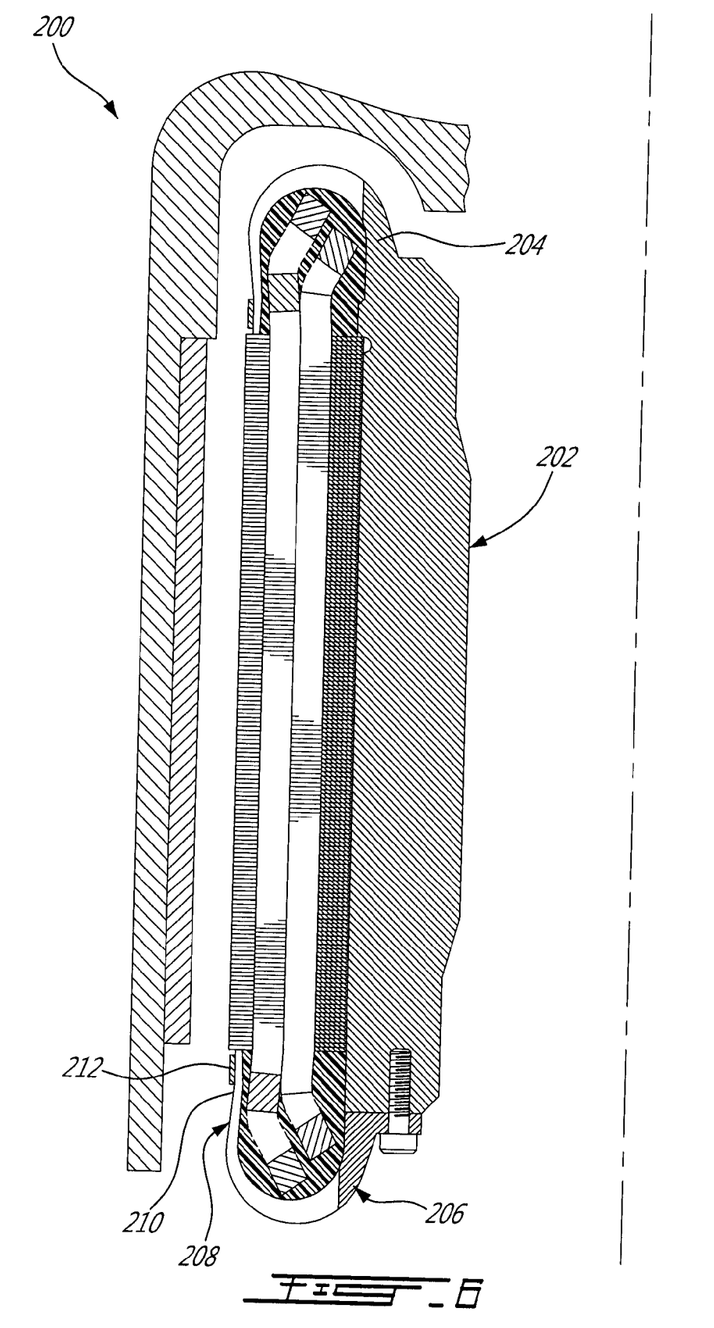
FIG. 6 is a sectional view of a portion of an electric machine incorporating the coil head-cooling element of FIG. 5.

Turning now to FIGS. 5 and 6 of the appended drawings, an electric machine 200 including a cooling assembly 202 according to a third illustrative embodiment will be briefly described. Since the electric machine 200 and the electric machines 10 and 100 described hereinabove are very similar, and for concision purposes, only the differences therebetween will be discussed hereinbelow.

Generally stated, the cooling assembly 202 of the machine 200 has an integral head-cooling element 204 at one end thereof and a removable head-cooling element 206 at the opposite end. Accordingly, fewer fasteners are required and a better heat transfer ensues.

As can be better seen from FIG. 5, the peripheral skirt 208 and the rounded portion 209 of the removable head-cooling element 206 includes a plurality of longitudinal slits 210 allowing deformation of the peripheral skirt. Accordingly, as can be seen from FIG. 6, the peripheral skirt 208 can be deformed by a tightening band 212 to decrease the volume of resin required to fill the space between the coil heads, the stator and the head-cooling element 206. Furthermore, since the path between the coil heads and the head-cooling element is shorter, a better cooling ensues.

One skilled in the art will understand that the integral head-cooling element 204 is also provided with a longitudinally slotted peripheral skirt secured by a tightening band.

One skilled in the art will understand that the fasteners used to mount the head-cooling elements to the body of the cooling assembly could be different than illustrated. As non-limiting examples, the head-cooling elements could be press-fitted, riveted of staked.

It is to be noted that the head-cooling elements could be provided with fluid cooling passages (not shown) allowing a direct heat extraction from the head-cooling elements.

It is also to be noted that while the stator of the electric machine is described hereinabove as being made of a stack of laminations, other technologies, such as, for example, stator pressed from sintered ferromagnetic powders, could be used.

It is also to be noted that, the operation, the structure and the assembly of the generally cylindrical body of the cooling assembly has not been described herein in details. However, the general principles of the cooling assemblies described in the following patents and published patent applications could be used for the cooling assembly body described hereinabove:

U.S. Pat. Nos. 6,819,016; 6,960,851; 6,992,411; WO 2010/012070A1; and WO 2010/081216A1.

These documents are included herein by reference in their entirety.

It is to be understood that the cooling assembly for electric machines is not limited in its application to the details of construction and parts illustrated in the accompanying drawings and described hereinabove. The cooling assembly for electric machines is capable of other embodiments and of being practiced in various ways. It is also to be understood that the phraseology or terminology used herein is for the purpose of description and not limitation. Hence, although the present cooling assembly for electric machines has been described hereinabove by way of illustrative embodiments thereof, it can be modified, without departing from the spirit, scope and nature thereof.

What is claimed is:

1. A cooling assembly for the stator of an electric machine provided with coils including heads; the cooling assembly including:
   a generally cylindrical cooling body provided with opposite longitudinal ends; and
   a head-cooling element mounted to one of the longitudinal ends of the generally cylindrical cooling body; the head-cooling element being so configured as to enclose the heads of the coils and to receive heat conducting material therein; the head-cooling element having a generally torus shape and including a circular flange provided with apertures so configured and sized as to allow fasteners to mount the head-cooling element to a longitudinal end of the generally cylindrical cooling body.

2. A cooling assembly as recited in claim 1, wherein the coils are prewound coils made of rectangular wire.

3. A cooling assembly as recited in claim 1, wherein the stator has a cylindrical cooling surface contacting the generally cylindrical cooling body.

4. A cooling assembly as recited in claim 1, wherein the circular flange includes an inwardly projecting triangular shoulder.

5. A cooling assembly as recited in claim 1, wherein the heat-conducting material includes a thermally conducting resin.

6. A cooling assembly as recited in claim 1, further comprising a second head-cooling element mounted to the other longitudinal end of the body.

7. A cooling assembly as recited in claim 1, wherein the head-cooling element is integral with the generally cylindrical cooling body.

8. A cooling assembly as recited in claim 1, wherein the head-cooling element is provided with a longitudinally slotted peripheral skirt.

9. A cooling assembly as recited in claim 8, wherein the slots of the peripheral skirt extend in a rounded portion of the head-cooling element.

10. A stator for electric machine, the stator comprising:
    a cooling surface;
    a plurality of slots so configured as to receive coils therein, each coil being provided with heads at longitudinal ends thereof;
    a generally cylindrical cooling body provided with opposite longitudinal ends and a cooling surface so configured as to contact the cooling surface of the stator; and
    a head-cooling element mounted to one of the longitudinal ends of the generally cylindrical cooling body; the head-cooling element being so configured as to enclose the heads of the coils and to receive heat conducting material therein; the head-cooling element having a generally torus shape and including a circular flange provided with apertures so configured and sized as to allow fasteners to mount the head-cooling element to a longitudinal end of the generally cylindrical cooling body.

11. A stator as recited in claim 10, wherein the circular flange includes an inwardly projecting triangular shoulder.

12. A stator as recited in claim 10, wherein the heat-conducting material includes a thermally conducting resin.

13. A stator as recited in claim 10, further comprising a second head-cooling element mounted to the other longitudinal end of the body.

14. A stator as recited in claim 10, wherein the head-cooling element is integral with the generally cylindrical cooling body.

15. A stator as recited in claim 10, wherein the head-cooling element is provided with a longitudinally slotted peripheral skirt.

16. A stator as recited in claim 15, wherein the slots of the peripheral skirt extend in a rounded portion of the head-cooling element.

* * * * *